United States Patent
Dussud et al.

(10) Patent No.: US 9,279,664 B2
(45) Date of Patent: Mar. 8, 2016

(54) DEVICE FOR MEASURING SLAB THICKNESS

(75) Inventors: Michel Dussud, Saint Martin en Haut (FR); Fabien Dejean, Lyons (FR)

(73) Assignee: AVEMIS S.A.S., Saint Symphorien sur Coise (FR)

( * ) Notice: Subject to any disclaimer, the term of this patent is extended or adjusted under 35 U.S.C. 154(b) by 201 days.

(21) Appl. No.: 14/125,738

(22) PCT Filed: Jun. 15, 2012

(86) PCT No.: PCT/EP2012/002548
§ 371 (c)(1),
(2), (4) Date: Dec. 12, 2013

(87) PCT Pub. No.: WO2012/171658
PCT Pub. Date: Dec. 20, 2012

(65) Prior Publication Data
US 2014/0131002 A1  May 15, 2014

(30) Foreign Application Priority Data
Jun. 16, 2011 (FR) .................................. 11 55281

(51) Int. Cl.
*B22D 41/08* (2006.01)
*G01B 11/06* (2006.01)
*B22D 11/18* (2006.01)
*G01B 21/08* (2006.01)
*G01F 23/24* (2006.01)
*B22D 46/00* (2006.01)
*C21C 5/46* (2006.01)
*C21C 5/52* (2006.01)

(52) U.S. Cl.
CPC .............. *G01B 11/06* (2013.01); *B22D 11/181* (2013.01); *B22D 46/00* (2013.01); *G01B 21/085* (2013.01); *G01F 23/245* (2013.01); *C21C 5/4673* (2013.01); *C21C 2005/5288* (2013.01); *Y02P 10/216* (2015.11)

(58) Field of Classification Search
CPC .... B22D 11/181; B22D 11/201; G01B 11/06; G01F 23/245
USPC ....................................... 266/78, 99
See application file for complete search history.

(56) References Cited

U.S. PATENT DOCUMENTS

2014/0131002 A1* 5/2014 Dussud ................ B22D 11/181
164/151.2

FOREIGN PATENT DOCUMENTS

| CN | 101829770 A | 9/2010 | |
|---|---|---|---|
| DE | 19962632 A1 | 6/2000 | |
| GB | 1600310 A | 10/1981 | |
| JP | 2002356709 A | 12/2002 | |
| TW | EP 0459049 A1 * | 12/1991 | ............... G01B 7/06 |

* cited by examiner

*Primary Examiner* — Scott Kastler
(74) *Attorney, Agent, or Firm* — Thomas Clinton; Donald M. Satina

(57) ABSTRACT

A device for measuring the thickness of slag on the surface of liquid metal contained in an ingot mould comprises a wire made of electrically conductive material and capable of being eliminated under the effect of the heat at the temperature of the slag, the wire having a free end able to be dipped into the slag, a wire feeder capable of displacing the wire so that its free end dips vertically into the slag according to a predetermined trajectory, a wire displacement measurer capable of measuring a distance travelled by the free end of the wire during a time interval between two predetermined events when the latter is displaced under the action of the feeding means, and a wire feeder controller having a molten metal contact detector capable of detecting contact between the free end and the surface of the liquid metal.

18 Claims, 4 Drawing Sheets

DEVICE FOR MEASURING SLAB THICKNESS

BACKGROUND OF THE INVENTION (1) Field of the Invention

The present invention relates to a device for measuring the thickness of slag on the surface of a liquid metal contained in a metallurgical vessel such as an ingot mould, notably of the continuous casting type.

(2) Description of the Related Art

Hereinafter in this description, the invention will be described with reference to the measuring of thickness of slag formed on the surface of a metal contained in an ingot mould without there being any limitation on the framework of the present invention whose design can be implemented in other metallurgical vessels containing a molten metal topped with a layer of slag, itself topped with a layer of non-molten powder. It will, however, be noted that the measurement of the level of slag in the ingot mould constitutes a preferred application of the present invention.

In the case of ingot mould casting, the conventional operation of continuous casting of a liquid metal schematically consists in continuously pouring the molten metal into a bottomless vertical tubular casting space of an ingot mould: this space is delimited by metal walls cooled by a circulation of water outside the casting space. The liquid metal flowing in the casting space is solidified at least on the surface, thus forming a skin, in contact with the walls of the ingot mould, before being continuously extracted from the ingot mould. The product extracted from the ingot mould is then corecooled by spraying water and then cut to the desired length.

Conventionally, a covering powder is added to the surface of the molten metal bath. This melts on contact with the metal so that it forms two layers: a layer of molten powder of 3 to 15 mm in contact with the liquid metal, called slag, and a layer of non-molten powder. The purposes of the casting powders are mainly to thermally insulate the liquid metal bath, to prevent oxidation and to lubricate the ingot mould with the film of molten powder (slag) which flows along the walls of the ingot mould. Secondarily, it will be noted that the layer of non-molten powder thermally insulates the layer of slag and, consequently, very favourably influences the thermal homogeneity of the slag.

The exact composition of the powder depends on the parameters of the casting. This composition is an important parameter which will act on the balance between the melting of the slag and the consumption of powder. Controlling this balance involves measuring the slag thickness.

Traditionally, the thickness of the slag is measured manually by means of two metal rods. In the case where the liquid metal contained in the ingot mould is steel, it is known practice to use a rod made of steel and a rod made of copper of the same length. These rods are dipped vertically and partially into the liquid metal, to the same height. The rod made of steel melts on contact with the liquid steel, but not with the slag. The rod made of copper melts on contact with the slag. Thus, after the removal of the two rods, the comparison of their remaining length enables the measurement of the thickness of the slag. The thickness of the slag in fact corresponds to the length difference between the rod made of steel and the rod made of copper.

However, these measurements are done manually, which proves restrictive, because these operations mobilize an operator who cannot fully attend to another activity and have to be carried out regularly for the best possible monitoring. Furthermore, there is a certain risk of inaccuracy in the measurements performed, affecting the reproducibility of these measurements.

BRIEF SUMMARY OF THE INVENTION

Thus, the aim of the present invention is to overcome all or some of these drawbacks by proposing an automatic device intended to check the thickness of a slag in order to optimize the choice of the type of powder based on the casting parameters and regularly check the conditions of lubrication of the ingot mould.

To this end, in its broadest aspect, the subject of the present invention is an automatic device configured for measuring thickness of a slag on the surface of a liquid metal contained in a metallurgical vessel, the device comprising:

a wire made of electrically conductive material capable of being eliminated under the effect of the heat at the temperature of the slag, the wire comprising a free end configured to be dipped into the slag, a wire feeder or means for feeding the wire, capable of displacing the wire so that its free end dips vertically into the slag according to a predetermined trajectory, a wire displacement measurer or measuring means capable of measuring a distance travelled by the free end of the wire during a time interval between two predetermined events when the latter is displaced under the action of the feeding means, and a wire feeder controller or means for controlling said feeding means, the wire feeder controller or control means comprising a molten metal contact detector or detection means, capable of detecting contact between the free end and the surface of the liquid metal.

In the context of the present invention, the term "wire" should be understood in its widest sense, that is to say that of a relatively long object (whose section is considerably smaller than the length), and whose flexibility allows it to be wound, for example, on a reel. Thus, the term "wire" encompasses wire, filament, cord, strand, tape, strip, etc. Furthermore, in the context of the present invention, the concept of "material capable of being eliminated under the effect of heat at the temperature of the slag" corresponds to a material that can be eliminated for example by melting, sublimation, vaporization, combustion, volatilization, etc.

Thus, according to one embodiment, the invention enables the automatic dipping of a wire into the slag until it reaches the surface of the liquid metal contained in the ingot mould, to hold it in position for a predetermined duration that is sufficient for the portion of wire immersed in the slag to be eliminated under the effect of the heat, then to dip it a second time into the slag until it reaches the surface of the liquid metal. By virtue of the wire displacement measurer or measuring means, the length of wire unwound during the last dip is calculated. This length corresponds to the portion of the wire immersed in the slag that has been eliminated under the effect of the heat and therefore corresponds to the thickness of the slag.

According to another feature of the device according to the invention, the wire displacement measurer or measuring means comprise an optical coder.

According to one embodiment, the device comprises a housing electrically linked to the wire, the housing being subject to a first potential, and a housing support or support means enabling the housing to rest on the ingot mould, said housing support or support means being electrically insulated from the housing and subject to a second potential, different from the first potential, so that the housing, the wire and the housing support or support means form an electrical circuit configured to exhibit, when the housing support or support means are in contact with the ingot mould, an open operating state in which the free end is situated at a distance from the liquid metal and a closed operating state in which the free end is in contact with the liquid metal, and the molten metal contact detector or detection means comprise the electrical circuit formed by the housing, the wire and the housing support or support means.

Indeed, the end of the wire and the housing support or support means are subject to different potentials. When the housing support or support means are in contact with the ingot mould (that is to say, when the housing is resting on the ingot mould), the ingot mould (which conventionally comprises an electrically conductive material, for example copper or steel) and the liquid metal (in contact with the ingot mould and therefore electrically linked thereto) are subject to the same potential as the housing support or support means. Thus, there is a voltage between the free end of the wire and the liquid metal. The contact between the free end and the liquid metal provokes a short circuit; the first potential equals the second. This enables the molten metal contact detector or detection means to detect the contact between the free end and the surface of the liquid metal, the wire feeder controller or control means consequently controlling the stopping of the wire feeder or feeding means in order to stop the travel of the wire and avoid it being dipped into the liquid metal.

According to another feature of the device according to the invention, the wire feeder or feeding means comprise a gear motor, the output shaft of which is linked to a feed roller driven in rotation by the gear motor, and a wire guide or means for guiding the wire configured to hold it in contact with the feed roller when the wire is displaced.

Advantageously, the wire guide or guiding means comprise a plurality of rollers that are free in rotation and arranged in an arc of circle concentric to the feed roller.

According to one embodiment, the device comprises a wire storage unit or means for storing the wire.

The wire storage unit or storage means may comprise a reel on which the wire is at least partially wound, and a wire director or means for pressing the wire against the reel.

The wire director or pressing means may comprise a pivoting arm provided with a wire director tensioner or return means and a skid, the skid being configured to come into contact with the wire wound on the reel under the effect of the wire director tensioner or return means.

According to yet another characteristic of the device according to the invention, the latter comprises a wire detector, or means for detecting the presence or absence of the wire at a point of its trajectory situated between the wire storage unit or storage means, and the wire feeder or feeding means.

This feature offers the advantage of allowing for the detection of the absence of wire upstream of the wire feeder or feeding means and to deduce therefrom the need to fit a new wire in the device. Upstream and downstream are, in the present case, defined relative to the direction of displacement of the wire when the latter is displaced to be dipped into the slag.

Advantageously, the device comprises a guiding arm provided with an output orifice configured to be passed through by the wire, the guiding arm configured to direct the wire directly above the liquid metal in order for it to dip therein vertically.

According to one embodiment, the wire has a melting temperature between 850 and 1200° C. and consists, for example, of a material comprising copper or brass.

For a liquid metal which is liquid steel, the copper melts in the slag, which ultimately enables the measurement of the thickness thereof. Furthermore, the copper is electrically conductive, which is advantageous because of the fact that the wire is continuously live.

With the device described hitherto, it is necessary to dip the free end of the wire twice into the slag in order to measure its thickness and, consequently, a quantity of wire whose length corresponds to two times the thickness of the layer of slag is injected into the slag. In certain cases, the chemical purity of the cast steel should be so high that such a pollution is not acceptable.

According to another embodiment and one that enables the halving of this pollution, the wire feeder controller, or means for controlling the wire feeder or feeding means, comprise a wire end detector or additional detection means, capable of detecting the passage of the free end of the wire and the presence or absence of the wire, at a predetermined point of its trajectory.

The wire end detector or additional detection means may be arranged inside the guiding arm, and the wire displacement measurer or measuring means are situated upstream of the wire detector or second detection means.

Thus, according to this embodiment, the invention enables automatically dipping a wire into the slag until it reaches the surface of the liquid metal contained in the ingot mould, to hold it in position for a predetermined duration that is sufficient for the portion of the wire immersed in the slag to be eliminated under the effect of the heat, then to remove it. By virtue of the wire displacement measurer or measuring means, the distance covered by the free end in the displacement of the wire towards the slag and that covered by this free end when the wire is extracted are calculated. Since the part of the wire immersed in the slag has melted when the wire was dipped into the slag, the difference between the calculated lengths corresponds to the thickness of the slag.

The wire end detector or additional detection means may comprise an excitation coil and two reception coils electromagnetically coupled to the excitation coil, the excitation coil and the reception coils being configured to be passed through by the wire, so that the measurement of the voltages induced in the reception coils enables the detection of the passage of the free end and the measurement of the impedance of the excitation coil enables the detection of the presence or absence of the wire.

Thus, when the wire is raised again, the wire end detector or additional detection means detect the passage of its free end at a predetermined point of its trajectory and the presence or not of the wire in the wire detector or second detection means. The wire feed controller or control means consequently control the stopping of the wire feeder or feeding means in order to stop the travel of the wire.

Advantageously, the wire end detector or additional detection means are arranged inside the guiding arm, and the wire displacement measurer or measuring means are situated upstream of the wire end detector or additional detection means.

Also the subject of the invention is a casting machine comprising an ingot mould comprising a lateral wall delimiting a casting space capable of receiving a liquid metal, characterized in that the casting machine also comprises a device having the abovementioned features.

Also the object of the invention comprises methods for measuring the thickness of a slag on the surface of a liquid metal contained in a metallurgical vessel as described in the following claims.

BRIEF DESCRIPTION OF THE SEVERAL VIEWS OF THE DRAWINGS

These features, and others, of the present invention will clearly emerge from the following description of a particular embodiment, given as a nonlimiting example, by referring to the appended drawings in which.

DETAILED DESCRIPTION OF THE INVENTION

Figure 1:
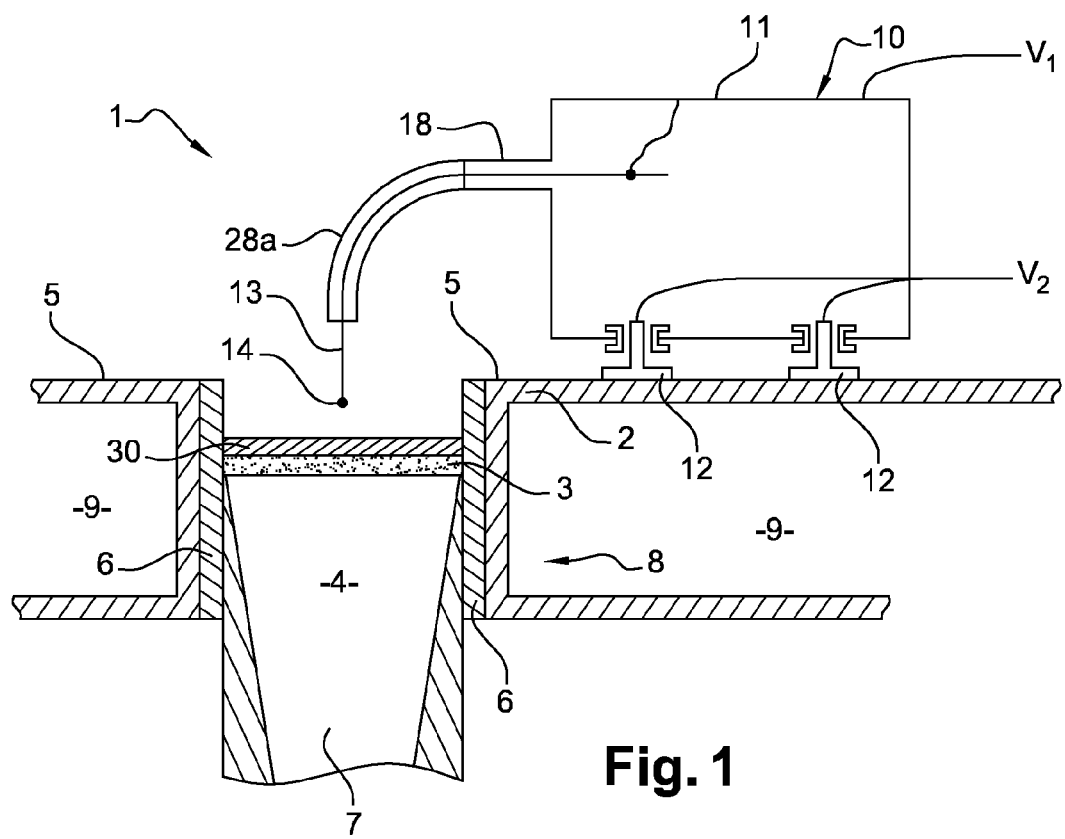
FIG. 1 is a partial and cross-sectional schematic view of a casting machine according to a particular embodiment of the invention.

A casting machine 1, partially represented in FIG. 1, comprises a metallurgical vessel, here, an ingot mould 2, notably of the continuous casting type, and a device 10, which can be seen in FIGS. 1 to 4 and 6 and 7, that enables the automatic measurement of the thickness of a slag 3 obtained by melting a casting powder 30 in the powdery state, on the surface of a liquid metal 4 (for example liquid steel) contained in the ingot mould 2. Conventionally, the ingot mould 2 comprises a top wall 5 and at least one lateral wall 6 delimiting a casting space 7, configured to receive the liquid metal 4, and a cooling compartment 8, configured to contain a cooling liquid 9, such as water, to cool the lateral wall 6 of the ingot mould 2. The cooling compartment 8 is generally arranged around the casting space 7. The lateral wall 6 is generally made of a heat-conducting material such as copper. The device 10 advantageously rests on the top wall 5 of the ingot mould 2.

Figure 2:
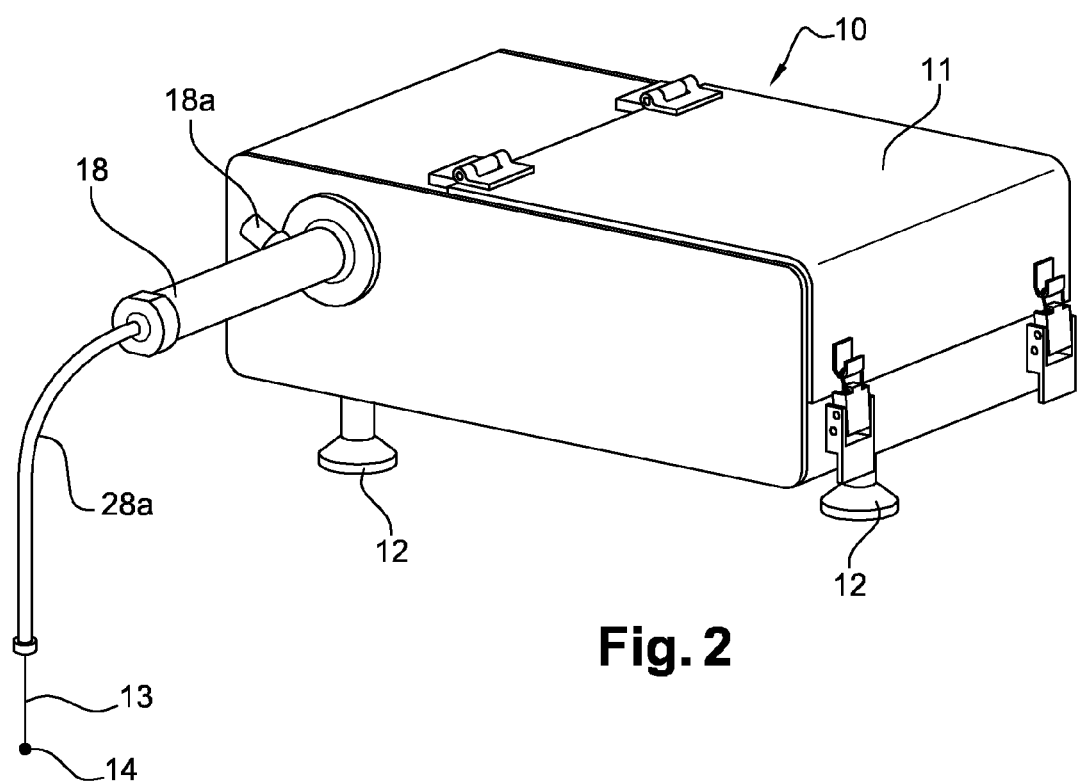
FIG. 2 is a perspective view, from above, of an automatic device for measuring slag thickness according to a particular embodiment.

The device 10 for measuring the thickness of the slag 3 which can be seen in FIG. 2, comprises a housing 11 and housing support or means for supporting the housing 11, for example three feet 12, configured to support the housing 11. The device 10 also comprises a wire 13. Advantageously, the wire 13 comprises copper or brass. It may have a diameter of 1.5 mm. The wire 13 has a free end 14 configured to be dipped into the slag 3.

Figure 3:
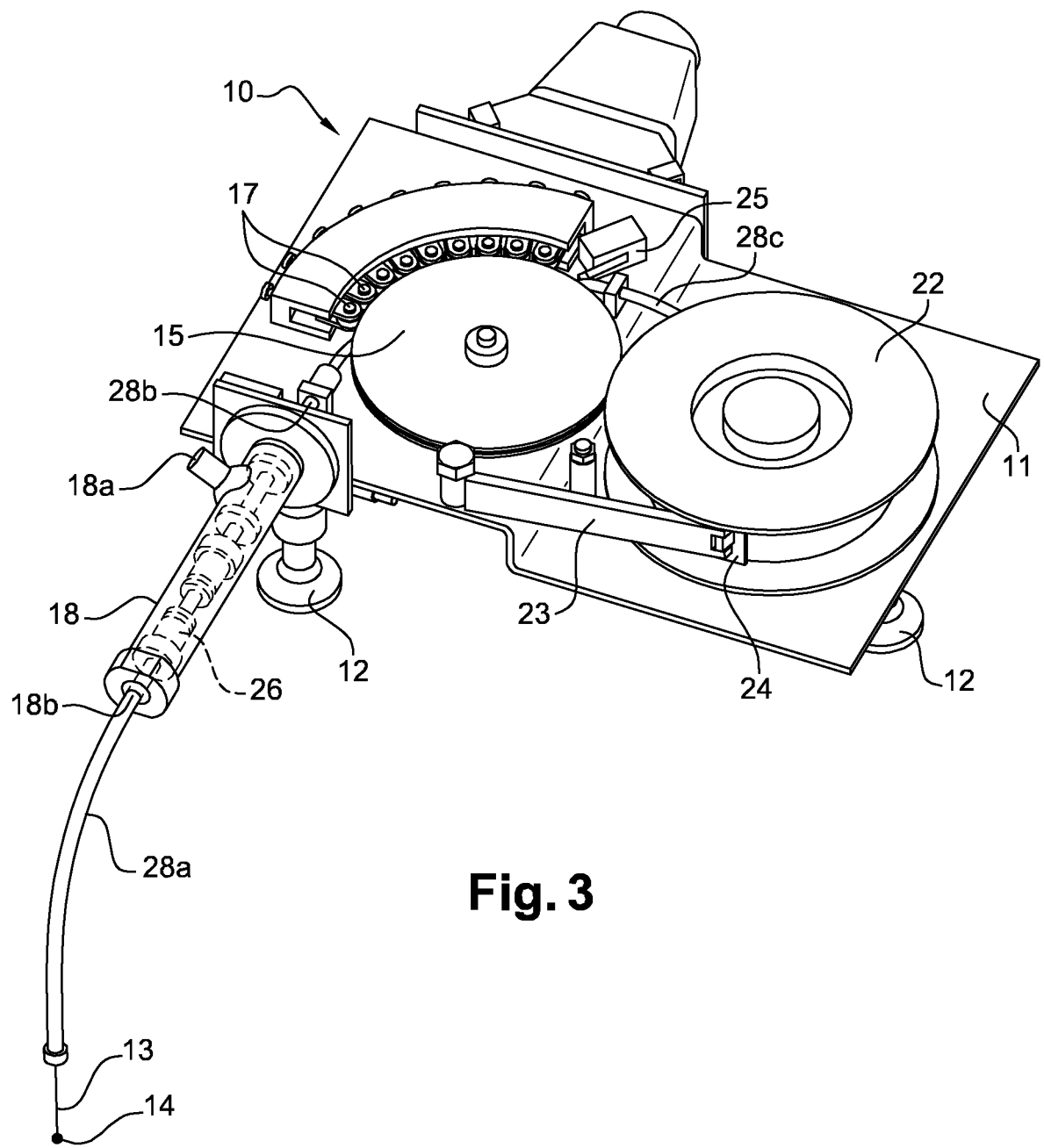
FIG. 3 is a perspective view of an automatic device for measuring slag thickness according to a particular embodiment, the top part of the housing having been removed.

The device 10 comprises wire feeder or means for feeding the wire 13 configured to displace it according to a predetermined trajectory so that the free end 14 of the wire 13 dips vertically into the slag 3. As can be seen in FIG. 3, the wire feeder or feeding means comprise a feed roller 15 driven in rotation by the output shaft of a gear motor 16. Depending on the direction of rotation of the output shaft of the gear motor 16, the free end 14 of the wire 13 is directed towards the liquid metal 4 or, alternatively, is moved away therefrom. The speed of displacement of the wire 13 may be of the order of 150 mm/s.

The wire feeder or feeding means also comprise a wire guide or means for guiding the wire 13, configured to hold it against the feed roller 15. The wire guide or guiding means comprise, in the example of FIG. 3, a plurality of rollers 17 mounted to rotate on the housing 11. The rollers 17 are arranged in an arc of circle concentric to the feed roller 15.

A hollow guiding arm 18, fastened to the housing 11, enables the continued guiding of the wire 13 outside of the housing 11 in order to place it directly above the liquid metal 4. The guiding arm 18 advantageously comprises an orifice 18a allowing for the passage of a coolant, for example air or nitrogen, inside the guiding arm 18, in order to cool the elements present in the guiding arm 18, subject to high temperatures because of the proximity with the liquid metal 4. The guiding arm 18 can measure from 30 cm to 1 m. In FIG. 3, the guiding arm 18 is shown as transparent.

Figure 4:
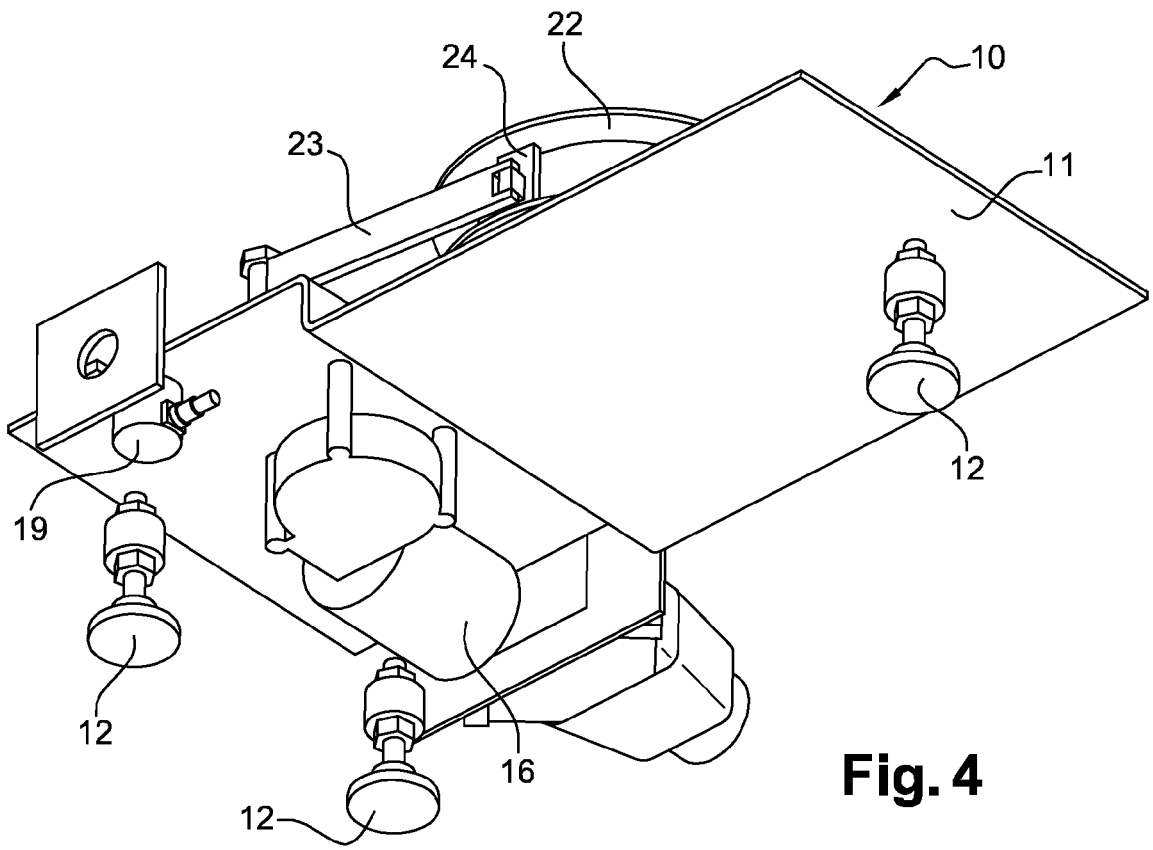
FIG. 4 is a partial exploded view, from above, and in perspective, of an automatic device for measuring slag thickness according to a particular embodiment.

The device 10 also comprises a wire displacement measurer or measuring means capable of measuring the distance covered by the free end 14 in displacement from a predetermined point of its trajectory. The measuring means comprise an optical coder 19. As can be seen in FIG. 4, the optical coder 19 is fastened under the housing 11. In the embodiment of the different figures, the optical coder 19 is placed between the guiding arm 18 and the feed roller 15. Conventionally, the optical coder 19 comprises a wheel 27, free in rotation, which can be seen in FIGS. 6 and 7, partly placed at the level of the predetermined point of the trajectory of the wire 13, so that the wheel 27 is driven in rotation by the wire 13 in displacement. A roller mounted free in rotation is placed in proximity to this wheel 27, so as to hold the wire pressed against the wheel 27. A counter enables the determination of the angular travel of the wheel 27 during a displacement of the wire 13. Since the diameter of the wheel 27 is known, it is possible to deduce therefrom the distance covered by the wire 13.

The device 10 comprises a wire feeder controller or control means configured to control the operation of the gear motor 16, and thus configured to automatically measure the thickness of the slag 3. The wire feeder controller or control means comprise, for this purpose, a molten metal contact detector or detection means, capable of detecting contact between the free end 14 and the surface of the liquid metal 4, and additional detection means, capable of detecting the presence or not of the wire 13 and capable of detecting the passage of its free end 14 at a predetermined point of its trajectory, alternatively described as a wire detector and a wire end detector.

The molten metal contact detector or detection means comprise an electrical circuit, which can be seen in FIG. 1, formed in particular by the housing 11, the wire 13 and the feet 12. In fact, the housing 11 is electrically subject to a first electrical potential V1. The wire 13 is also subject to this first potential V1, because the wire 13 is electrically linked to the housing 11. Moreover, the feet 12, electrically insulated from the housing 11, are subject to a second electrical potential V2. When the device 10 is resting on the ingot mould 2 via the feet 12, the electrical circuit is completed by the ingot mould 2 which, because of the contact with the feet 12, is subject to the second potential V2, and by the liquid metal 4 contained in the ingot mould 2, it also being subject because of this to the second potential V2. The first potential V1 and the second potential V2 are different. The operation of the electrical circuit will be detailed below.

Figure 5:
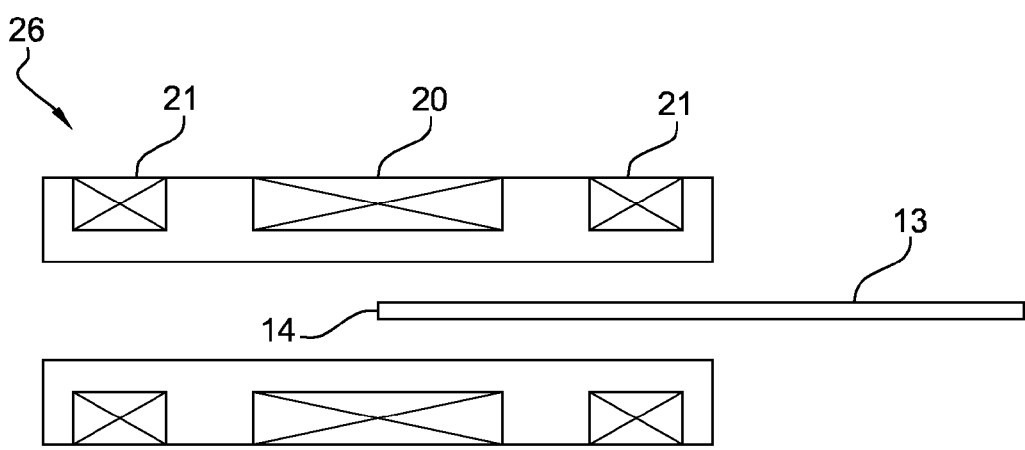
FIG. 5 is a schematic and cross-sectional view of the wire end detector or additional detection means of an automatic device for measuring slag thickness according to a particular embodiment.
Figure 6:
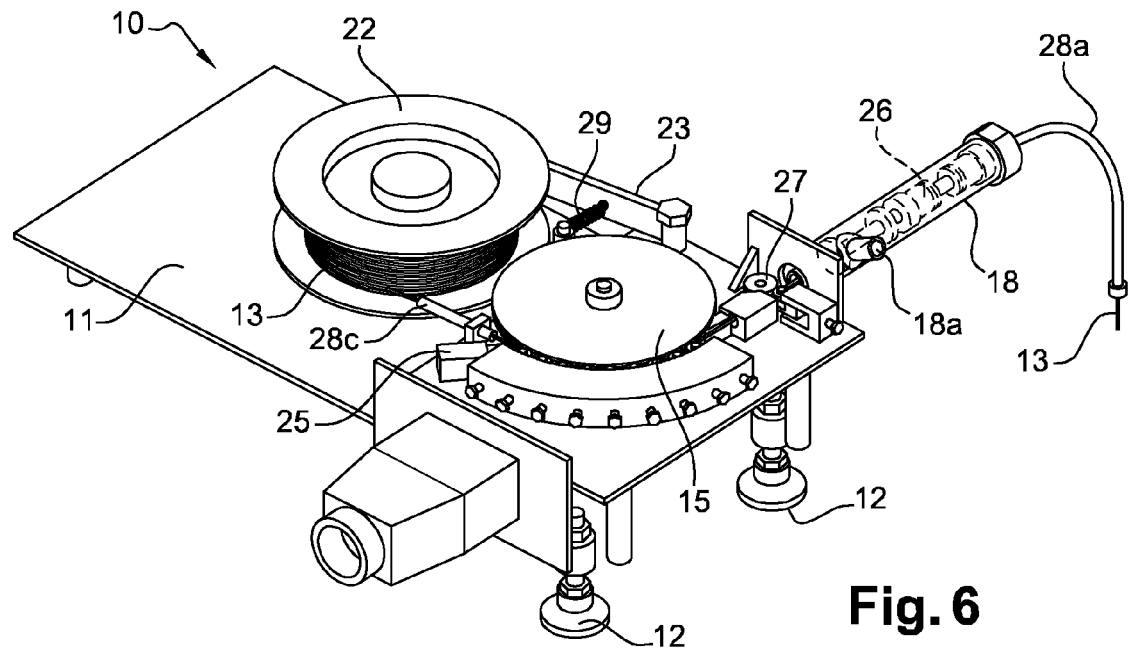
FIG. 6 is a perspective view of an automatic device for measuring slag thickness according to a particular embodiment.
Figure 7:
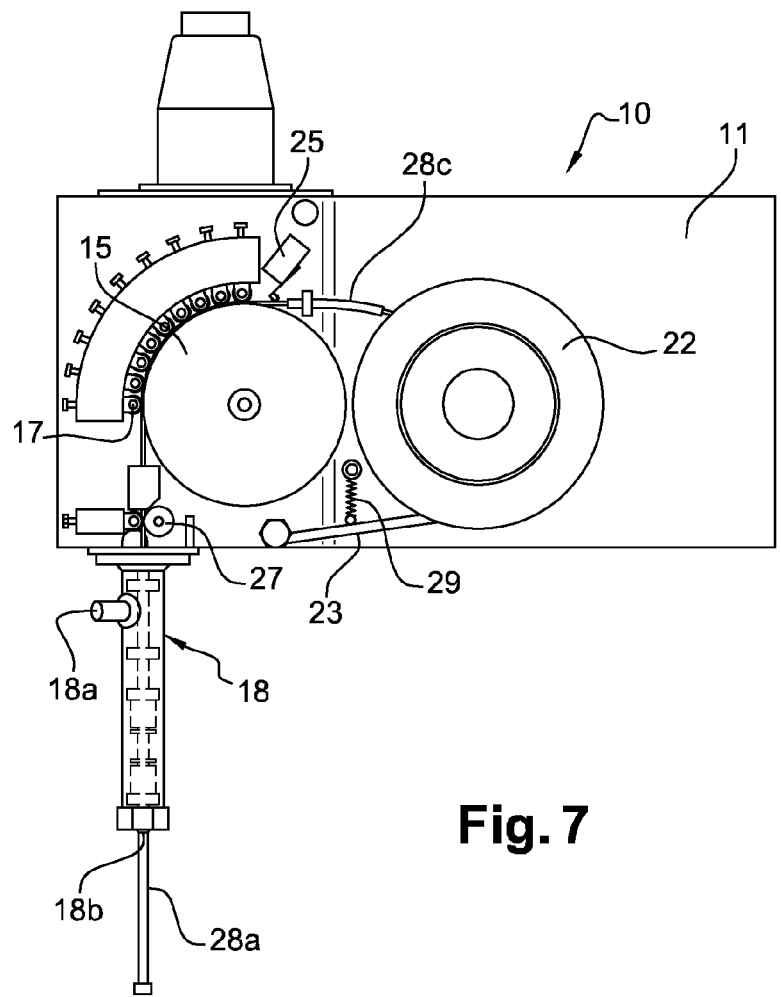
FIG. 7 is a plan view of an automatic device for measuring slag thickness according to a particular embodiment of the invention, a part of the housing having been removed.

The wire end detector or additional detection means comprise an excitation coil 20 and two reception coils 21, electromagnetically coupled to the excitation coil 20. The excitation coil 20 and the reception coils 21, represented in FIG. 5, are configured to be passed through by the wire 13.

The excitation coil 20 is organized so as to be arranged between the reception coils 21. The assembly 26 of the excitation 20 and the reception 21 coils is placed on the trajectory of the wire 13, outside of the housing 11 and preferentially in the guiding arm 18, downstream relative to the optical coder 19. The excitation coil 20 is linked to an electrical power supply (not represented) to enable the excitation coil 20 to generate an electromagnetic field passing through the reception coils 21. The arrangement of the reception coils 21 and their respective dimensions are adapted so that the flux of the magnetic field generated by the excitation coil 20 passing through each reception coil 21 is the same, in the absence of any disturbance caused by the displacement of the wire 13 inside the excitation coil 20. The wire end detector or additional detection means also cooperate with a computation unit designed to deduce the passage of the free end 14 as a function of the difference in the voltages induced in the reception coils 21 and the presence or not of the wire 13 in the excitation coil 20 by the measurement of the impedance of the excitation coil 20.

The wire feeder controller or control means cooperate with remote processing electronics (not represented) capable of governing the operation of the gear motor 16 according to information supplied by the first and second detection means, alternatively described as the molten metal contact detector and the wire end detector, and comprising the abovementioned computation unit, the computation unit also configured to calculate the distance covered by the free end 14 in a displacement based on the information supplied by the optical coder 19.

The device 10 may comprise a wire storage unit or means for storing the wire 13 inside the housing 11, for example a reel 22. The reel 22 is mounted free in rotation on the housing 11. The wire 13 is wound, at least partially, on the reel 22. When the gear motor 16 feeds, via the feed roller 15, the wire 13 in displacement to make it dip into the slag 3, the wire is unwound from the reel 22. An arm 23, mounted to pivot on the housing 11, provided with a wire director tensioner or return means, for example a traction spring 29, and a skid 24, may be provided to hold the part of the wire 13 wound on the reel 22 in permanent contact therewith. As can be seen in FIG. 3, the skid is mounted to pivot on an end of the arm 23, and bears against a part of the wire 13 wound on the reel 22.

A wire detector, or means for detecting the presence of the wire 13, are arranged between the feed roller 15 and the reel 22. These detection means comprise, for example, a contacter 25. Thus, when all of the wire 13 is unwound, and the reel 22 is empty, the contacter 25 enables the detection of the passage of the terminal end of the wire 13. This makes it possible to know when it becomes necessary to replace the wire 13, already mostly consumed, with a new wire 13.

As can be seen in FIG. 3, the device 10 may comprise guiding members 28a, 28b and 28c configured to define the trajectory of the wire 13. In particular, the guiding member 28a makes it possible to ensure that the wire 13 dips vertically into the slag 3.

The device 10 as described hitherto operates as follows.

In an initial configuration given as an example, the free end 14 of the wire 13 is situated between the excitation coil 20 and the feed roller 15. The wire feeder controller or control means launch the start of a cycle to measure the thickness of the slag 3, ideally periodically. To this end, the gear motor 16 rotationally drives the feed roller 15 so as to unwind the wire 13 partially wound onto the reel 22. This also has the effect of displacing the free end 14, notably inside the guiding arm 18, towards the excitation coil 20. When the free end 14 arrives at the middle of the excitation coil 20, the latter triggers a reset of the measurement parameters. The displacement of the wire 13 drives the rotation of the wheel 27 of the optical coder 19. Once the parameters have been reset, that is to say when the free end arrives at the middle of the excitation coil 20, the distance covered by the free end 14 is calculated by virtue of the angular travel of the wheel 27 of the optical coder 19. Once out of the guiding arm 18, the free end 14 is guided by the curved guiding member 28a, so as to dip vertically into the slag 3.

The free end 14 of the wire 13 is continuously live and subject, via the housing 11, to the electrical potential V1. The surface of the liquid metal is subject to the second electrical potential V2, via the ingot mould 2 and the feet 12 in contact with the ingot mould 2. Thus, when the free end 14 is situated at a distance from the liquid metal 4, the electrical circuit formed by the housing 11, the wire 13, the liquid metal 4, the ingot mould 2 and the feet 12 is open.

When the free end 14 dips into the slag 3, the electrical circuit remains open, because the slag 3 is electrically insulating. On the other hand, as soon as the free end 14 arrives in contact with the surface of the liquid metal 4, the electrical circuit is closed. The first potential V1 equalizes the second potential V2. This signal allows for the detection, by the processing electronics, of the contact between the free end 14 and the surface of the liquid metal 4. The wire feeder controller or control means consequently control the stopping of the gear motor 16. However, because of a certain mechanical inertia, the wire 13 tends to slightly continue its travel just after the command to stop the gear motor 16. Thus, a part of the wire 13 nevertheless dips into the liquid metal 4. If this is not taken into account, the measurement of the thickness of the slag 3 may be falsified. Also, the distance covered by the free end 14 from the instant of its contact with the surface of the liquid metal 4 to the instant of its complete immobilization is determined, notably by virtue of the optical coder 19. This distance will then be taken into account in calculating the thickness of the slag 3.

Once the wire 13 is immobilized in this position, the wheel 27 of the optical coder 19 stops revolving.

A time delay, of 1 to 2 s for example, is provided to hold the wire 13 in this position so that its part immersed in the slag 3 melts. Thus, after the melting of this part of the wire 13, the free end 14 is situated level with the top surface of the slag 3.

Once this time has elapsed, the wire feeder controller or control means reactivate the gear motor 16 which, via the feed roller 15, drives, in the direction opposite to the preceding direction of displacement, the displacement of the wire 13. The free end 14 then moves away from the slag 3 and is displaced towards the output orifice 18b of the guiding arm 18. By being displaced, the wire 13 makes the wheel 27 of the optical coder 19 revolve again, but this time in the other direction. The angular travel of the wheel 27 enables the calculation of the distance covered by the free end 14 from the slag to its passage at the middle of the excitation coil 20. After the free end 14 has been detected by the wire end detector or additional detection means, the wire feeder controller or control means control the stopping of the gear motor 16. The wire 13 is immobilized.

Because of the melting of a part of the wire 13 in the slag 3, the wire 13 has been shortened in the course of the measurement cycle. There is consequently a difference in the angular travels completed by the wheel 27 of the optical coder 19. Since the diameter of the wheel 27 is known, this difference in angular travels is equivalent to a length corresponding to the difference in distance covered by the free end 14 before and after its contact with the surface of the liquid metal 4. This difference is due to the shortening of the wire 13. It thus corresponds to the thickness of the slag 3 (once account has been taken of the length of the wire 13 having dipped and melted in the liquid metal 4).

Thus, the invention enables the automatic and periodical measurement of the thickness of the slag 3 on the surface of a liquid metal 4 contained in an ingot mould 2.

Obviously, the invention is in no way limited to the embodiment described above, this embodiment having been given solely as an example. Modifications are still possible, notably from the point of view of the construction of the various elements of the device 10, or by substituting technical equivalents, without in any way departing from the framework of the invention.

We claim:

1. Device for measuring thickness of a slag on the surface of a given liquid metal contained in a metallurgical vessel, the device comprising:
    a wire made of electrically conductive material and configured to be eliminated under the effect of the heat at the temperature of said slag, the wire comprising a free end configured to be dipped into said slag, wherein said wire is at least partially wound on a reel mounted free in rotation,
    a wire feeder configured to feed the wire from the reel, capable of displacing the wire so that its free end dips vertically into the slag according to a predetermined trajectory,
    a wire displacement measurer capable of measuring a distance travelled by the free end of the wire during a time interval between two predetermined events when the wire is displaced under the action of the wire feeder, and
    a wire feeder controller comprising a molten metal contact detector capable of detecting contact between the free end of the wire and the surface of the liquid metal.

2. Device according to claim 1, wherein the wire displacement measurer comprises an optical coder.

3. Device according to claim 1, wherein the device comprises a housing electrically linked to the wire, the housing being subject to a first potential (V1), and a housing support enabling the housing to rest on the metallurgical vessel, said housing support being electrically insulated from the housing and subject to a second potential (V2), different from the first potential (V1), so that the housing, the wire and the housing support form an electrical circuit configured to exhibit, when the housing support is in contact with the metallurgical vessel, an open operating state in which the free end is situated at a distance from the liquid metal and a closed operating state in which the free end is in contact with the liquid metal, and in that the molten metal contact detector comprises the electrical circuit formed by the housing, the wire and the housing support.

4. Device according to claim 1, wherein the wire feeder comprises a gear motor, the output shaft of which is linked to a feed roller driven in rotation by the gear motor, and a wire guide configured to hold the wire in contact with the feed roller when the wire is displaced.

5. Device according to claim 4, wherein the wire guide comprises a plurality of rollers that are free in rotation and arranged in a circle arc concentric to the feed roller.

6. Device according to claim 1, wherein the device comprises a wire storage unit.

7. Device according to claim 6, wherein the wire storage unit comprises a reel on which the wire is at least partially wound, and a wire director configured to press the wire against the reel.

8. Device according to claim 7, wherein the wire director comprises a pivoting arm provided with a wire director tensioner and a skid, the skid being configured to come into contact with the wire wound on the reel under the effect of the wire director tensioner.

9. Device according to claim 1, wherein the device comprises a wire detector at a point of its trajectory situated between the wire storage unit and the wire feeder.

10. Device according to claim 1, wherein the device comprises a guiding arm provided with an output orifice configured to be passed through by the wire, the guiding arm configured to direct the wire directly above the liquid metal in order for it to dip therein vertically.

11. Device according to claim 1, wherein the wire has a melting temperature between 850 and 1200° C.

12. Device according to claim 1, wherein the wire feeder controller comprises a wire end detector, configured to detect the passage of the free end and the presence or absence of the wire, at a predetermined point of its trajectory.

13. Device according to claim 12, wherein the wire end detector comprises an excitation coil and two reception coils electromagnetically coupled to the excitation coil, the excitation coil and the reception coils being configured to be passed through by the wire, so that the measurement of the voltages induced in the reception coils enables the detection of the passage of the free end and the measurement of the impedance of the excitation coil enables the detection of the presence or absence of the wire.

14. Device according to claim 12, wherein the wire end detector is arranged inside the guiding arm, and the wire displacement measurer is situated upstream of the wire end detector.

15. Casting machine comprising an ingot mould comprising a lateral wall delimiting a casting space capable of receiving a liquid metal, wherein the casting machine further comprises a device according to claim 1.

16. Method for measuring the thickness of a slag on the surface of a liquid metal contained in a metallurgical vessel comprising the following steps:
    feeding of a wire so that its free end dips vertically into the slag according to a predetermined trajectory;
    detecting the passage of the free end of the wire at a predetermined point of its trajectory, triggering a wire displacement measurer configured to measure a distance travelled by the free end of the wire;
    detecting contact between the free end of the wire and the surface of the liquid metal and stopping the wire feeder;
    immobilizing the wire for a predetermined time that is sufficient to allow the portion of the wire dipped into the slag to be eliminated;
    feeding the wire in an opposite direction along the same predetermined trajectory;
    detecting the passage of the free end of the wire at the same predetermined point of its trajectory and reading the distance travelled by the free end of the wire.

17. Method for measuring the thickness of a slag on the surface of a liquid metal contained in a metallurgical vessel comprising the following steps:
    feeding the wire so that its free end dips vertically into the slag according to a predetermined trajectory;
    detecting contact between the free end of the wire and the surface of the liquid metal, stopping the wire feeder and triggering the wire displacement measurer configured to measure a distance travelled by the free end of the wire;
    immobilizing the wire for a predetermined time that is sufficient to enable the portion of the wire dipped into the slag to be eliminated, thereby generating a new wire free end;

feeding the wire so that its new free end dips vertically into the slag according to a predetermined trajectory;

detecting contact between the new free end of the wire and the surface of the liquid metal, stopping the wire feeder and reading of the distance travelled by the new free end of the wire.

18. Device according to claim 1, wherein the wire is comprised of a material selected from the group consisting of copper and brass.

\* \* \* \* \*